US006422713B1

(12) United States Patent
Fohl et al.

(10) Patent No.: US 6,422,713 B1
(45) Date of Patent: Jul. 23, 2002

(54) THIN-SHEET COLLIMATION OPTICS FOR DIODE LASER ILLUMINATION SYSTEMS FOR USE IN NIGHT VISION AND EXTERIOR LIGHTING APPLICATIONS

(75) Inventors: Timothy Fohl, Carlisle, MA (US); Jeffrey Thomas Remillard, Ypsilanti; Willes H. Weber, Ann Arbor, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/688,992

(22) Filed: Oct. 17, 2000

(51) Int. Cl.[7] .................................................. F21V 7/04
(52) U.S. Cl. .......................... 362/31; 362/26; 362/339; 385/146
(58) Field of Search ........................... 362/31, 26, 297, 362/339; 385/146

(56) References Cited

U.S. PATENT DOCUMENTS

| 5,165,772 A | 11/1992 | Wu |
| 5,434,754 A | 7/1995 | Li et al. |
| 5,700,078 A | 12/1997 | Fohl et al. |
| 5,791,757 A | 8/1998 | O'Neil et al. |
| 5,857,770 A | 1/1999 | Fohl et al. |
| 5,890,796 A | 4/1999 | Marinelli et al. |
| 6,036,340 A | 3/2000 | Fohl et al. |
| 6,224,223 B1 * | 5/2001 | Higuchi et al. ............... 362/31 |

* cited by examiner

Primary Examiner—Thomas M. Sember
Assistant Examiner—Ronald E. DelGizzi
(74) Attorney, Agent, or Firm—Jennifer Stec

(57) ABSTRACT

An optical element, a lighting system utilizing the optical element and a method of manipulating light from a source to provide an illumination pattern suitable for use in a night vision system and exterior lighting applications is disclosed. The optical element has an input surface and an output surface disposed at approximately perpendicular to the input surface. A stepped surface angles between the input surface and the output surface intersecting the light inside the optical element. Multiple facets are formed in the stepped surface to reflect the light towards the output surface. The input, stepped and output surfaces are arranged such that the light reflects only from the stepped surface. The optical element has a rectangular shape in one embodiment and a wedge shape in a second embodiment.

27 Claims, 4 Drawing Sheets

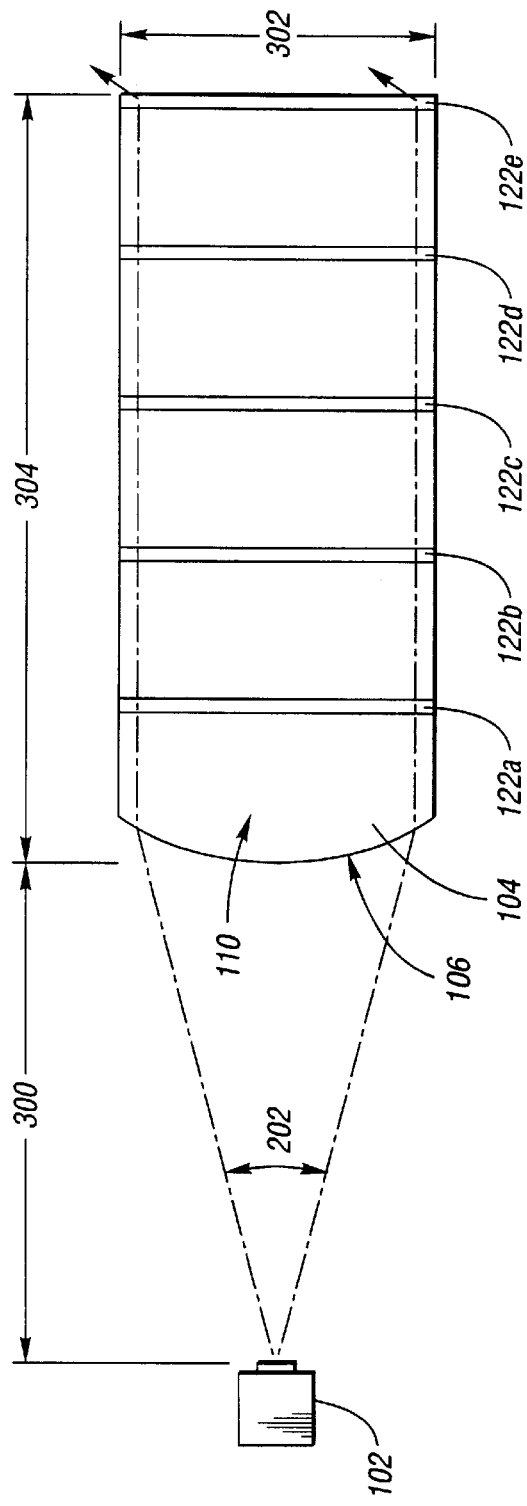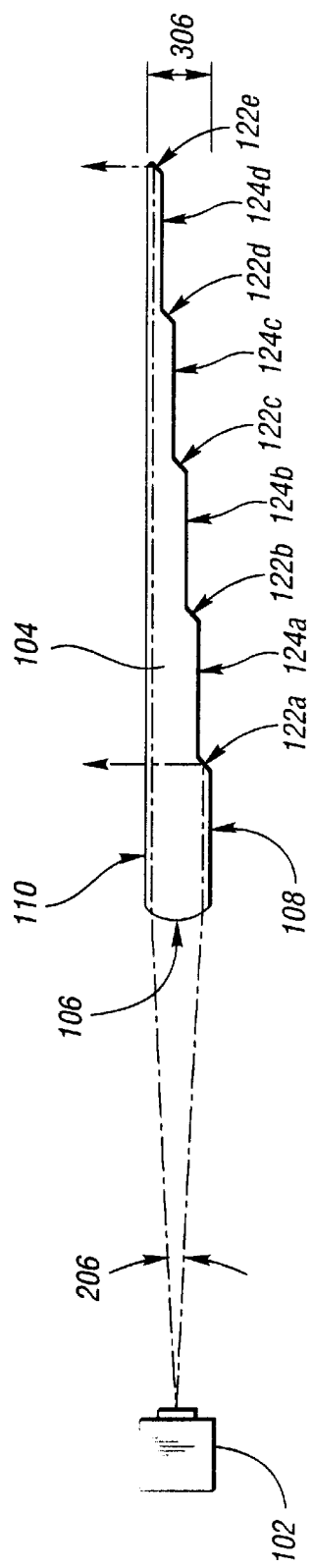

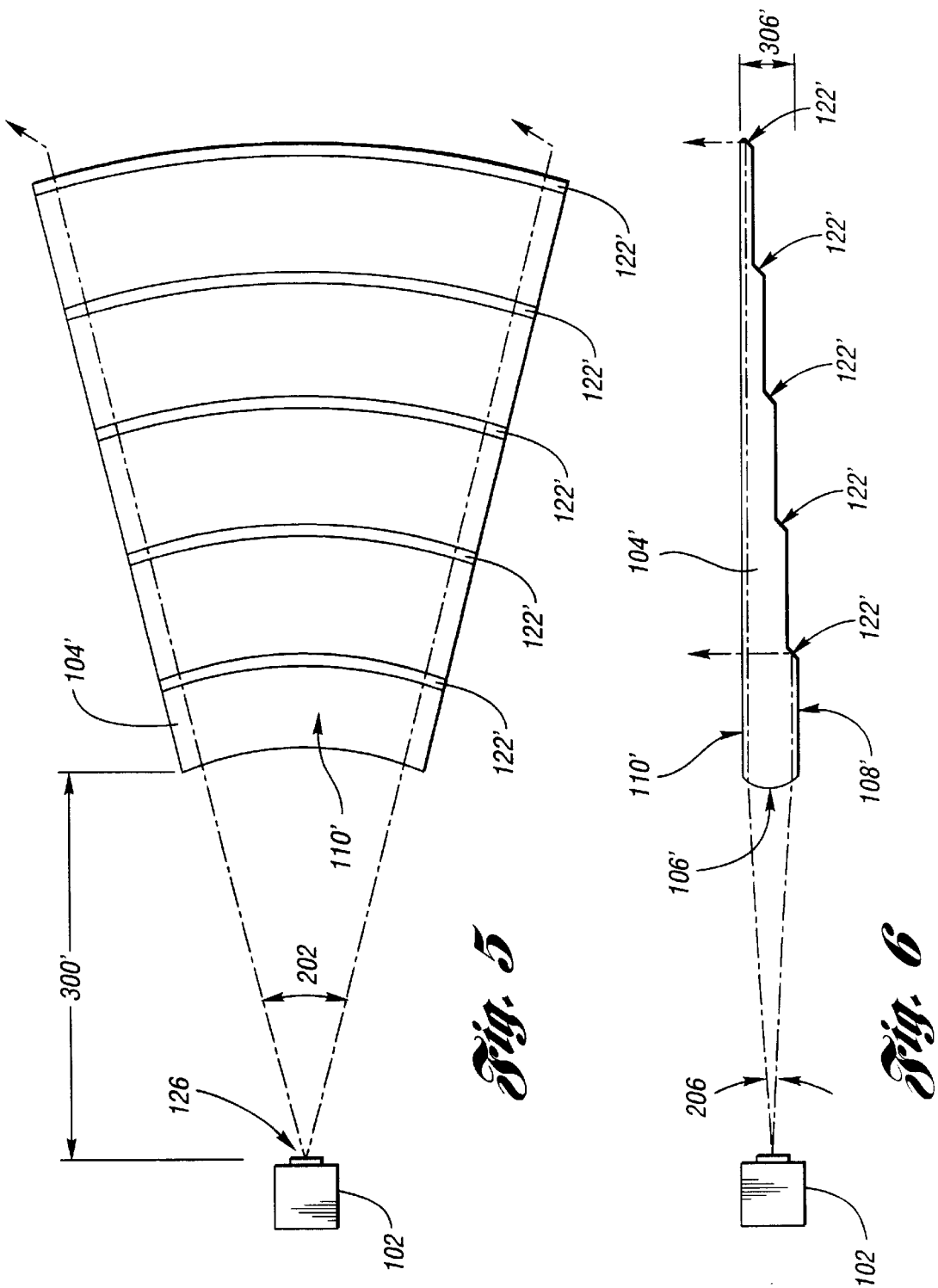

THIN-SHEET COLLIMATION OPTICS FOR DIODE LASER ILLUMINATION SYSTEMS FOR USE IN NIGHT VISION AND EXTERIOR LIGHTING APPLICATIONS

TECHNICAL FIELD

The present invention is related to the field of thin-sheet optics for automotive exterior lighting applications, including night vision systems.

BACKGROUND ART

Conventional lighting systems used in automotive vehicle applications such as headlights, taillights, and active night vision systems utilize an incandescent bulb with a reflector. The light emitted by the incandescent bulb is generally collimated by the reflector. The incandescent bulb may be used to generate light in the visible spectrum for headlight and taillight applications. Active night vision systems typically require near-infrared emissions that are compatible with solid state CCD or CMOS cameras to illuminate the scenery.

Advances in the solid state lasers have given rise to thin-sheet lighting systems for use in taillight and active night vision systems. The thin sheet systems require less space than bulb and reflector systems. Furthermore, laser diodes are more energy efficient and reliable than incandescent bulbs. A challenge in thin-sheet lighting systems is to rapidly spread the laser light over a sufficiently wide area to meet spatial illumination and eye safety requirements required under law. Many different approaches have been suggested to expand the point source of laser light uniformly over several square inches of an exterior optical surface.

U.S. Pat. No. 5,791,757, issued to O'Neil et al. on Aug. 11, 1998, discloses a lighting system that uses a uniform thickness thin-sheet optical element. This optical element has a plurality of micro-optical wedges that collimate and direct a divergent laser light emitted from multiple fiber optic bundles. Diffractive optical elements are disposed intermediate the thin-sheet and fiber optics to direct the laser light to predetermined regions of the plurality of micro-optical wedges. The diffractive optical elements guide the light to the micro-optical wedges either in a direct path, or by bouncing the light off the exterior side of the thin-sheet opposite the micro-optical wedges. The optical efficiency of this approach could be improved upon if the diffractive optical element could be eliminated. Design complexity could be reduced if each of the micro-optical wedges did not have to be designed to receive the light from a different incident angle.

DISCLOSURE OF INVENTION

The present invention is an optical element, a lighting system utilizing the optical element and a method of manipulating light from a source to provide an illumination pattern suitable for use in a night vision system and exterior lighting applications. Optical efficiency is maximized in that the light passes through as few as two surfaces, and is reflected only once by the optical element. Design complexity is minimized as all reflective surfaces in the optical element can be formed with the same orientation.

Light emitted from the source has a naturally divergent emission pattern. A predetermined distance between the source and optical element is provided to allow the emission pattern to spatially expand prior to reaching the optical element. The spatially expanded emission pattern partially or totally fills an input surface of the optical element.

Light enters the optical element through the input surface. The light exits the optical element through an output surface that is approximately perpendicular to the input surface. A stepped surface of the optical element is angled between the input surface and output surface to intersect the light. Multiple facets are formed in the stepped surface to reflect the light toward the output surface. The facets, input surface, and output surface are arranged such that light reflects from only the facets in passing from the input surface to the output surface. A net result is that the divergent emission pattern of the light emitted from the source is manipulated into a broader illumination pattern emitted from the output surface.

In one embodiment, the facets are arranged in a striped pattern paralleling a narrow dimension of a rectangular shape. Here, the input surface has a curvilinear shape to collimate the light in a first plane parallel to the output surface. In another embodiment, the facets are arranged along arcs about an axis normal to the output surface. Now, the input surface allows the light to continue to diverge in the first plane to fill the arc. In both embodiments the curvilinear input surface or external lens may collimate the light in a second plane perpendicular to the output surface. Collimating the light prevents the light from striking outer surfaces of the optical element prior to reflecting from the facets. Where necessary, a second optical element may be disposed between the source and the optical element to provide the proper divergent emission pattern at the optical element.

Accordingly, it is an object of the present invention to provide an optically efficient optical element, lighting system and method for manipulating a light having a divergent emission pattern to produce a broader illumination pattern wherein the light is reflected from only once inside the optical element.

These and other objects, features and advantages will be readily apparent upon consideration of the following detailed description in conjunction with the accompanying drawings.

BRIEF DESCRIPTION OF DRAWINGS

FIG. 3 is a front view of a first embodiment of a lighting system;

FIG. 4 is a side view of the first embodiment of the lighting system;

FIG. 5 is a front view of a second embodiment of the lighting system;

FIG. 6 is a side view of the second embodiment of the lighting system;

BEST MODE FOR CARRYING OUT THE INVENTION

Figure 1:
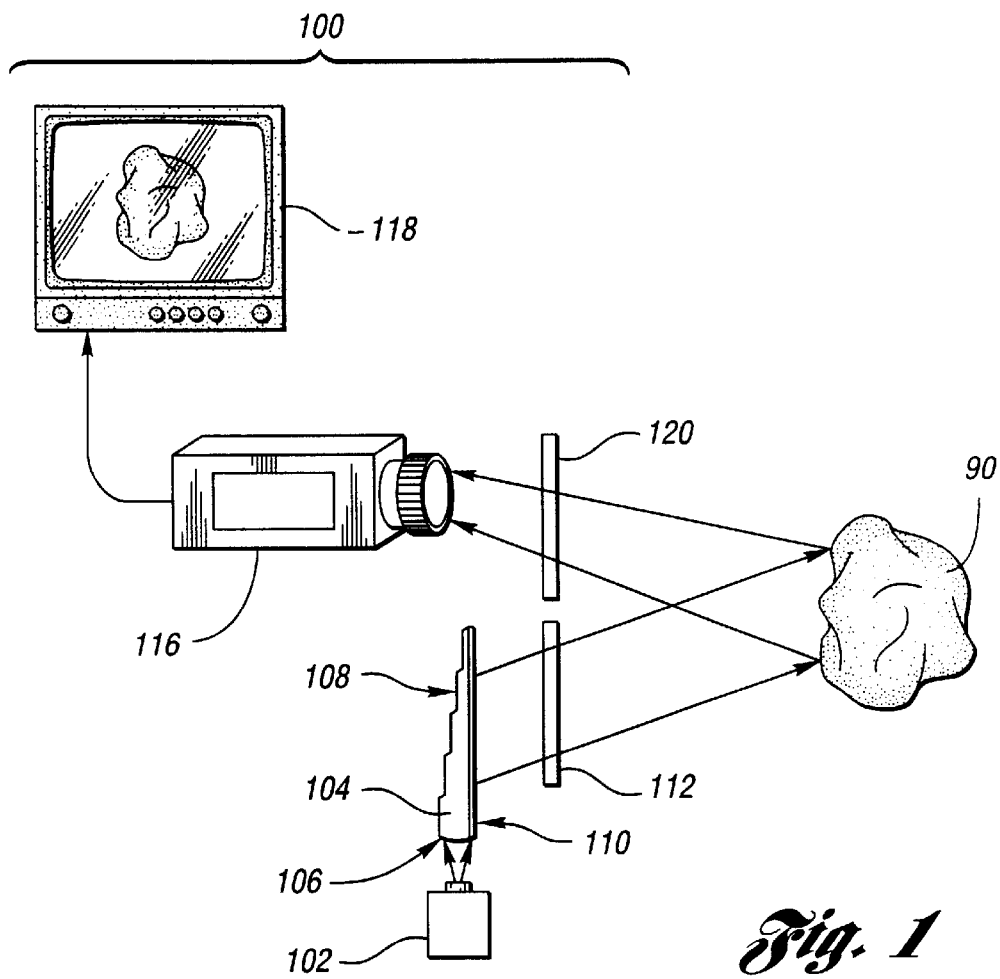
FIG. 1 is a diagram of the present invention utilized in an active night vision system.

FIG. 1 is illustrative of the present invention utilized in an active night vision system 100. A laser light source 102 is used to generate a near-infrared light. A thin-sheet optical element 104 receives the light through an input surface 106. The light is reflected inside the optical element 104 from a stepped surface 108, sending the light through an output surface 110.

A lens, diffuser, holographic plate, pillow optics, diffractive optics or any other optical device 112 may be positioned adjacent or adjoining the output surface 110. This other optical device 112 manipulates the laser light to create a desired illumination pattern ahead of the night vision system 100. In one embodiment, the optical element 104 is designed to emit the desired illumination pattern by itself.

Landscaping, man made items, road surface, signs, animals, people and other objects 90 reflect the laser light back toward the night vision system 100. A camera 116 creates video images of the objects 90 illuminated by the laser light. The video images are displayed on a video display 118.

A narrow band filter 120 is typically placed before the camera 116. The narrow band filter 120 shields the camera 116 from bright sources of visible light such as on-coming headlights from other automobiles, street lights, billboard lights, and the like.

Figure 2:
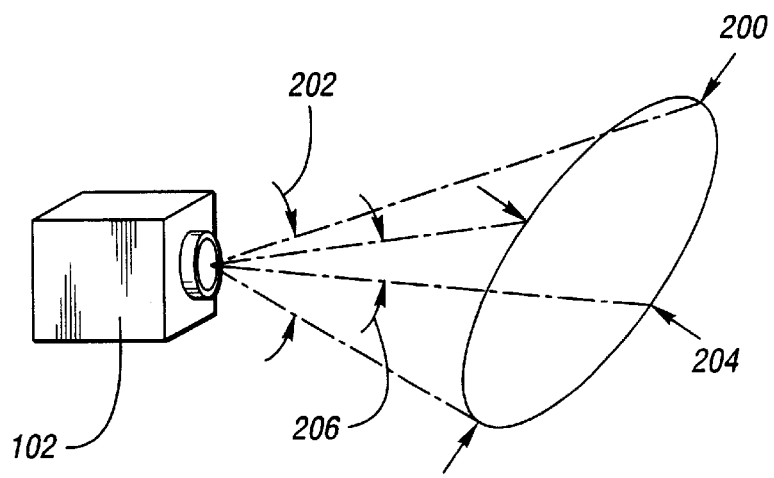
FIG. 2 is perspective view of an emission pattern of a laser diode.

Laser light emitted from a solid state laser diode type of laser light source 102 usually has a fast axis 200 and a narrower slow axis 204, as shown in FIG. 2. Fast axis 200 is associated with a first divergent emission angle 202 that is typically around thirty-five degrees. Slow axis 204 is associated with a second divergent emission angle 206 that is typically around ten degrees. The first and second divergent emission angles 202 and 206 may be larger or smaller depending upon the type and design of the laser light source 102. The present invention takes advantage of these divergent emission angles 202 and 206 to spatially expand the light source's emission pattern without requiring additional optics commonly found in other designs.

Other types of light sources 102 emitting divergent light at other wavelengths may be used within the scope of the present invention. For example, the light source 102 may emit a visible red light for use in a taillight application. What is valuable is that the emission pattern is divergent so that it spatially expands as the light moves away from the light source 102.

FIG. 3 is front view of the laser light source 102 and optical element 104. Laser light source 102 is positioned away from the optical element 104 by a predetermined distance, as indicated by distance 300. Predetermined distance 300 is chosen so that the light spatially expands a desired amount along a direction parallel to a width of the optical element 104. The width of the optical element is indicated by dimension 302.

In the preferred embodiment, the light fills the input surface 106 in the width 302 direction. When used in the night vision system 100, a preferred width 302 of the optical element 104 is 50 mm (millimeters). Larger and smaller widths 302 may be used within the scope of the present invention as required by the particular application.

Input surface 106 of optical element 104 has an aspherical curve to collimate the light as it enters the optical element 104. Collimation is accomplished in a plane parallel to the output surface 110 and along a direction parallel to a length of the optical element 104. The length is indicated by dimension 304.

FIG. 4 is a side view of the laser light source 102 and optical element 104 shown in FIG. 3. The light emitted from the laser light source 102 spatially expands over predetermined distance 300 along a direction parallel to a depth of the optical element 104. The depth of optical element 104 is indicated by dimension 306.

In the preferred embodiment, the light fills the input surface 106 in the depth 306 direction. Depth 306 of the optical element 104 generally ranges from around 5 mm to around 10 mm Thicker and thinner depths 306 may be used within the scope of the present invention. For example, depth 306 could be made as thin a one millimeter.

Input surface 106 of optical element 104 may have a curvature along the depth 306 direction to collimate the light in a plane perpendicular to the output surface. Collimation is accomplished along a direction parallel to the length 304 of the optical element 104 in a plane perpendicular to the output surface 110.

Stepped surface 108 is formed in the optical element 104 generally angled between input surface 106 and output surface 110. As viewed in FIG. 4. stepped surface 108 spans between the bottom of input surface 106 to the far side of output surface 110.

Stepped surface 108 if formed with multiple facets 122a-e arranged in a stair-like configuration. Facet 122a is the lowest facet 122 of the stair and the closest facet 122 to input surface 106. Facet 122e is the highest facet 122 of the stair and the furthest facet 122 from input surface 106. Facets 122 are separated from each other by flat regions 124. Flat regions 124 are arranged to be parallel to the output surface 110.

Each facet 122 is formed at an angle with respect to the output surface 110. In the preferred embodiment, all of the facets 122 are set at a 45° angle to reflect the light towards output surface 110 along a direction normal to the output surface 110. Other angle may be used, including different angles for different facets 122 to produce variations in the illumination pattern.

All of the facets 122 are designed to reflect the collimated light using total internal reflection. Total internal reflection of light occurs in a optical medium where an incident angle $\theta$ of light upon a surface exceeds a critical angle $\theta_c$ given by equation 1:

$$\theta_c = \sin^{-1}(n_1/n_2) \quad (1)$$

where $n_1$ is the index of refraction of a surrounding medium and $n_2$ is the index of refraction of the optical medium.

In the preferred embodiment, the optical element 104 is fabricated from a polycarbonate having an index of refraction of approximately $n_2=1.489$. Furthermore, the surrounding medium is air with an index of refraction of unity ($n_1=1$). This produces a critical angle of approximately ec $\theta_c=42°$. With the facets 122 angled at 45° with respect to the incident light, then the light will reflect from the facets by the process of total internal reflection.

Some application within the scope of the present invention may require the facets 122 to be angled less than the critical angle. In these cases, a layer of reflective material, such as metal, may be deposed on the outside of the stepped surface 108. Alternatively, other transparent optical materials having other indices of refraction may be used including, but not limited to acrylic, plastic and glass.

The number of facets 122 and the size of each facet 122 is application specific. In general, there should be at least three or more facets 122. Increasing the number of facets 122 increases the uniformity of the illumination pattern emitted through the output surface 110 at the cost of a thicker optical element 104. Uniformity of the illumination pattern can be improved by slightly curving the facets 122 in one or more directions so that they cause a slight dispersion of the light as they reflect the light.

The effect of the optical element 104 is to disperse the optical energy emitted from the laser light source 102 over a large area. Using the preferred dimensions of 50 mm for width 302, 125 mm for length 304 and 5 mm for depth 306 the optical element 104 has an input surface area to output surface area ratio of 4%. Ignoring optical losses, this translates into the optical irradiance exiting the output surface 110 that is on average twenty-five times smaller than what is entering the input surface 106. This ratio can be changed by changing the optical element's dimensions 302, 304 and 306. For example, increasing the depth to 12.5 mm changes the ratio to 10%. Decreasing the depth to 1.25 mm decreases the ratio to 1%. This ratio can be adjusted to provide an optical irradiance at the output surface 110 that meets eye-safety requirements documented in American National Standards Institute, Washington D.C., document ANSI Z136.1-1993 entitled "Safe Use of Lasers".

A second embodiment of the present invention is illustrated in FIG. 5. Here, the optical element 104' has a generally wedge shape output surface 110'. Facets 122' follow along arcs at various radii about a central axis 126 normal to the output surface 110'. Likewise, input surface 106' follows an arc about the central axis 126.

In the second embodiment, the laser light source 102 is positioned with its output at the central axis 126. As light spreads out from the laser light source 102 in the first divergent angle 202, it enters the optical element 104' perpendicular to the input surface 106' as measured in the plane parallel to the output surface 110'. Input surface 106' allows the light to continue to diverge at the first divergent emission angle 202 inside the optical element 104'. There is no need to collimate the light in the plane parallel to the output surface 110'.

Preferably, the angle formed by the wedge shape matches or exceeds the first divergent emission angle. This is done so that the input surface 106' gathers all or most of the incident light.

FIG. 6 is a side view of the embodiment shown in FIG. 5. As was done in the first embodiment, the input surface 106' may be curved to collimate the light in a plane perpendicular to the output surface 110'. Here again, the depth 306' of the optical element 106' is chosen so that the input surface 106' gathers all or most of the light along the second divergent emission angle 206.

Figure 7:
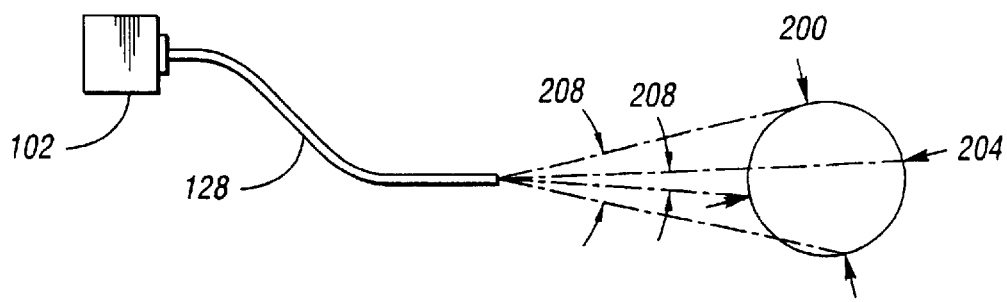
FIG. 7 is a diagram of a light source coupled to fiber optics.

It may be impractical in some applications to mount the laser light source 102 the predetermined distance 300 from the input surface. In these cases, fiber optics 128 may be used to remotely locate the laser light source 102 or any other light source as shown in FIG. 7. An optical difference caused by the fiber optics 128 is that the first divergent angle 202 and the second divergent angle 206 are usually the same thus producing a common divergent angle 208. This common divergent angle 208 generally ranges from 10° to 40° full-width-at-half-maximum intensity. Consequently, the depth 306 of the optical element 104 should match the width 302.

Figure 8:
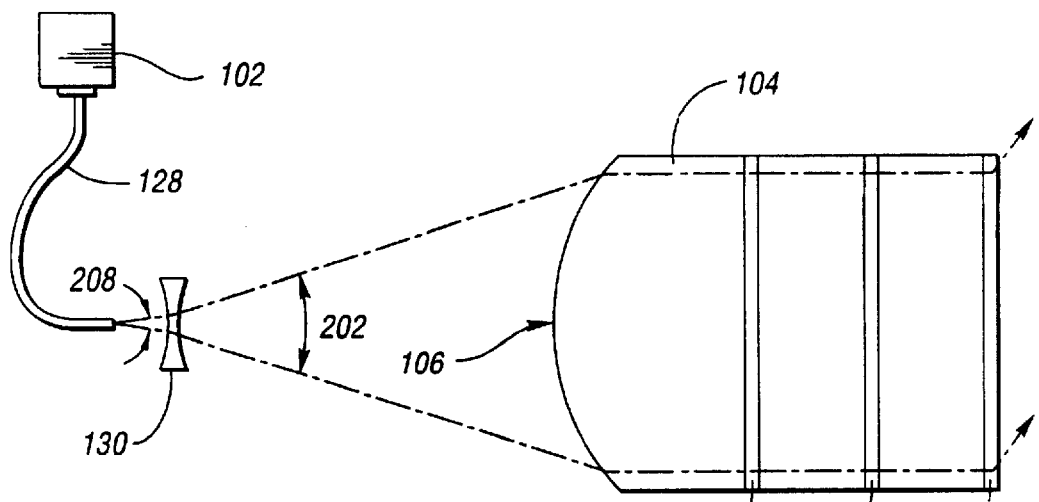
FIG. 8 is top view of a third embodiment.

In another embodiment, a lens, holographic plate, diffractive optics, or other suitable second optical element 130 may be disposed between the fiber optics 128 and the input surface 106 of the optical element 104 as shown in FIG. 8. The second optical element 130 can modify the common divergent emission angle 208 to reproduce the first divergent emission angle 202 and second divergent emission angle 206, or any other divergent emission angles.

Lighting system applications sometimes require the illumination pattern to have some divergence. This could be accomplished by adding the other optical device 112 as shown in FIG. 1. Alternatively, the input surface 106 and facets 122 can be shaped to accomplish the same function.

Figure 9:
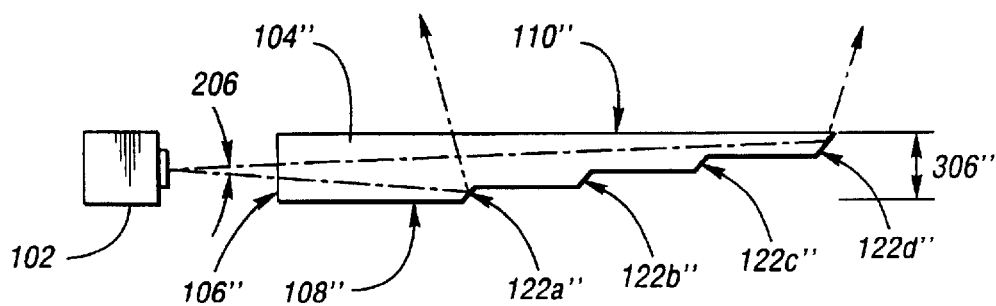
FIG. 9 is a side view of a fourth embodiment.

An example is shown in FIG. 9 where the input surface 106" is linear along the depth 306" direction. Now, the second divergent emission angle 206 is allowed to propagate into the optical element 104". In other words, the input surface 106" diverges the light in the plane perpendicular to the output surface 110". Light beams reaching the farthest facet 122d" have an incident angle greater than 45° and thus exit the output surface 110" angled slightly away from the laser light source 102. Other light beams strike the nearest facet 122a" at an incident angle slightly less than 45° and thus exit the output surface 110" slightly angled back towards the laser light source 102. (The angles are exaggerated in FIG. 9 for illustrative purposes.)

In other examples, the angle of each individual facets 122 can each be made slightly different to cause a divergence in the illumination pattern. The output surface 110 may be formed as a micro-lens array, and a holographic light shaping diffuser (available from Physical Optics Corporation, Torrance, California) can be attached to the output surface 110. Similar changes may be made to the input surface 106, facets 122, and output surface 110 to cause a divergence in the illumination pattern along the width 302 direction.

While the best mode for carrying out the invention has been described in detail, those familiar with the art to which this invention relates will recognize various alternative designs and embodiments for practicing the invention as defined by the following claims.

What is claimed is:

1. An optical element for directing a light, the optical element comprising:
   an input surface for receiving the light;
   an output surface generally perpendicular to the input surface for emitting the light; and
   a stepped surface angling between the input surface and the output surface, the stepped surface having a plurality of reflecting facets arranged so that the light is reflected only by the plurality of reflecting facets in passing from the input surface to the output surface.

2. The optical element of claim 1 further comprising a curvilinear shape of the input surface for collimating the light in a first plane parallel to the output surface.

3. The optical element of claim 2 wherein the curvilinear shape diverges the light in a second plane perpendicular to the output surface.

4. The optical element of claim 2 wherein the curvilinear shape collimates the light in a second plane perpendicular to the output surface.

5. The optical element of claim 1 further comprising a curvilinear shape of the input surface for diverging the light in a first plane parallel to the output surface.

6. The optical element of claim 1 wherein the plurality of facets arc about an axis normal to the output surface.

7. The optical element of claim 1 further comprising:
   an output area of the output surface; and
   an input area of the input surface, the input area being no greater than ten percent of the output area.

8. A lighting system comprising:
   a source of a light, the light being divergent in an emission pattern; and
   an optical element disposed a predetermined distance from the source, the optical element having an input surface for receiving the light from the source, an output surface approximately perpendicular to the input surface for emitting the light, and a stepped surface angled between the input surface and the output surface, the stepped surface having a plurality of reflecting facets arranged so that the light is reflected only by the plurality of reflecting facets in passing from the input surface to the output surface, the predetermined distance for spatially expanding the emission pattern of the light prior to the input surface.

9. The lighting system of claim 8 further comprising a first dimension of the input surface such that the emission pattern approximately fills the first dimension at the input surface.

10. The lighting system of claim 9 further comprising a second dimension of the input surface such that the emission pattern approximately fills the second dimension at the input surface.

11. The lighting system of claim 8 further comprising a second optical element disposed between the source and the optical element for broadening the emission pattern in a plane parallel to the output surface.

12. The lighting system of claim 8 wherein the plurality of facets arc about an axis normal to the output surface.

13. The lighting system of claim 12 further comprising:
the source being positioned at approximately the axis, and the source having an emission divergent angle measured normal to the axis; and
the plurality of facets arcing through an angle measured normal to the axis, the angle of the plurality of facets being at least as great as the emission divergence angle of the source.

14. A method for manipulating a light emitted from a source, the light being divergent in an emission pattern from the source, the method comprising:
spatially expanding the emission pattern of the light over a predetermined distance between the source and an optical element;
inserting the light into an input surface of the optical element in response to spatially expanding the emission pattern;
reflecting the light only from a plurality of facets formed in a stepped surface of the optical element in response to inserting the light; and
emitting the light from an output surface of the optical element in response to reflecting the light.

15. The method of claim 14 further comprising collimating the light in a first plane parallel to the output surface in response to spatially expanding the light.

16. The method of claim 15 further comprising diverging the light in a second plane perpendicular to the output surface in response to spatially expanding the light.

17. The method of claim 15 further comprising collimating the light in a second plane perpendicular to the output surface in response to spatially expanding the light.

18. The method of claim 14 further comprising broadening the emission pattern in a plane parallel to the output surface while spatially expanding the emission pattern.

19. A thin sheet optical element comprising:
an aspherical entrance surface for collimating light passing through the entrance surface;
a substantially planar exit surface generally perpendicular to an axis of symmetry of the entrance surface; and
a stepped surface opposing the substantially planar exit surface having a plurality of steps generally parallel to the exit surface separated by associated angled facets disposed at an angle to reflect the light passing through the entrance surface through the optical element and out the exit surface.

20. The optical element of claim 19 wherein at least one of the angled facets is disposed at an angle to provide total internal reflection of light from the entrance surface through the optical element and out the exit surface.

21. The optical element of claim 20 wherein the at least one angled facet is disposed at an angle of about forty-five degrees.

22. The optical element of claim 19 wherein the aspherical entrance surface, the exit surface, and the stepped surface are fabricated from plastic.

23. The optical element of claim 22 wherein the aspherical entrance surface, the exit surface, and the stepped surface are fabricated from polycarbonate.

24. The optical element of claim 19 wherein the angled facets are disposed at different angles to disperse reflected light.

25. The optical element of claim 19 wherein at least one of the angled facets is disposed at an angle to provide internal reflection of light from the entrance surface through the optical element and out the exit surface.

26. The optical element of claim 19 wherein the stepped surface includes a reflective material disposed on the angled facets to reflect light through the optical element and out the exit surface.

27. The optical element of claim 19 wherein the angled facets are skew relative to the output surface.

* * * * *